United States Patent [19]

Bickraj

[11] Patent Number: 5,089,734

[45] Date of Patent: Feb. 18, 1992

[54] DUAL ROTARY AC GENERATOR

[76] Inventor: Ramsingh Bickraj, Enid Village, Rio Claro, Trinidad and Tobago

[21] Appl. No.: 618,216

[22] Filed: Nov. 26, 1990

[51] Int. Cl.$^5$ ............................................. H02K 23/60
[52] U.S. Cl. ................................... 310/83; 310/115; 310/116; 475/271
[58] Field of Search ............... 310/83, 115, 118, 114, 310/116, 117, 120, 121, 122, 78; 475/269, 271, 303

[56] References Cited

U.S. PATENT DOCUMENTS

| | | | |
|---|---|---|---|
| 2,191,872 | 2/1940 | Upton | 310/120 |
| 2,564,741 | 8/1951 | Vermillion | 310/118 |
| 2,939,973 | 6/1960 | Crane et al. | 310/121 |
| 3,370,220 | 2/1968 | Douglass et al. | 322/40 |
| 4,056,746 | 11/1977 | Burtis | 310/115 |
| 4,467,230 | 8/1984 | Rovinsky | 310/83 |
| 4,644,206 | 2/1987 | Smith | 310/115 |

Primary Examiner—Steven L. Stephan
Assistant Examiner—D. L. Rebsch

[57] ABSTRACT

A generator includes a rotatable housing carrying permanent magnets for creating a magnetic field, an armature carrying electrical coils and a gear set for simultaneously rotating the housing and magnetic-field-creating permanent magnets in a direction opposite to the direction of rotation of the armature coils. The armature or field can be rotated separately by a clutch or transmission.

7 Claims, 1 Drawing Sheet

DUAL ROTARY AC GENERATOR

BACKGROUND OF THE INVENTION

This invention relates to generators. Generators create an electromotive force (emf) by rotating a plurality of coils of wire within a magnetic field created by, for example, one or more permanent magnets. The emf generated can be expressed as emf=NABw and, as can be seen, is a function of the strength of the magnetic field B, the number N and the area A of the coils passing through the magnetic field and the angular velocity w at which the coils pass through the magnetic field. It can be seen that increasing any one of these parameters will increase the emf or power output of the generator.

SUMMARY OF THE INVENTION

The present invention is directed to a generator structure for increasing the emf generated by the device without increasing the actual angular velocity of the rotating coils or for providing an emf at an actual coil angular velocity less than that which would be required by present devices to emf generate the same emf.

These objects are achieved according to the invention by means for rotating the magnetic field simultaneously with and in a direction opposite to that of the rotating coils carried by the armature of the generator so as to effectively increase the angular velocity at which the coils cut through the magnetic field.

According to the invention, the magnetic field creating means is mounted on the inner surface of a rotatable housing and gear means is interposed between the coil carrying armature and the magnetic field carrying housing for rotating the housing and magnetic field simultaneously with and in a direction opposite to the direction of rotation of the armature coils.

According to a preferred embodiment, the gear means comprises a planetary gear set including a sun gear on the armature, a ring gear on the housing and at least one planet gear between the sun and ring emf gears.

According to another embodiment, the gear means comprises a gear set including a first gear on the armature, a second gear driven by the first gear, a pinion gear operatively connected to the second gear driving a ring gear on the generator housing. The generator housing is journaled for co-axial rotation relative to the armature.

According to another embodiment of the invention, the pinion gear is operatively connected to the second gear that is driven by the first gear on the armature by way of a transmission interposed between the second gear and pinion gear.

According to yet another embodiment, the pinion gear is operatively connected to the second gear which is driven by the first gear on the armature by way of a clutch interposed between the second gear and pinion gear.

BRIEF DESCRIPTION OF THE DRAWINGS

The invention will be better understood after reading the following Detailed Description of the Preferred Embodiment in conjunction with the drawings in which.

DETAILED DESCRIPTION OF THE PREFERRED EMBODIMENT

Figure 1:
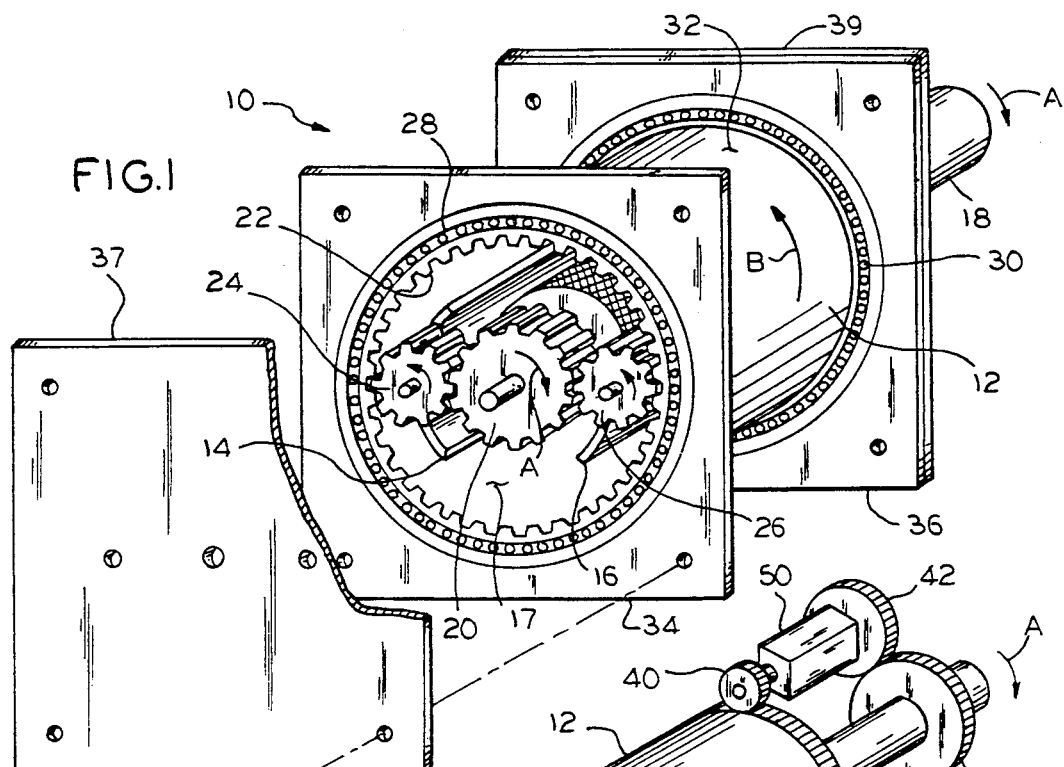
FIG. 1 is a perspective view of a preferred embodiment of a generator according to the invention showing details of construction.

Shown in FIG. 1 is a generator 10 including a tubular housing 12 having magnetic field creating means in the form of permanent magnets, two of which 14, 16 are shown, mounted on the inner surface 17 of the housing. An armature 18 carrying a plurality of coils is journaled for rotation co-axially within the housing by well-known means. The structure described thus far is conventional in that the permanent magnets create a magnetic field within the housing and through which the coils carried by the armature pass as the armature is rotated by an external power source.

According to the invention, the housing 12 and the permanent magnets are caused to rotate simultaneously with and in a direction opposite to the direction of rotation of the armature by a gear set including, in the embodiment shown in FIG. 1, a planetary gear arrangement having a sun gear 20 on the armature 18, a ring gear 22 mounted on the inner surface 17 of the housing at one end of the housing and at least one and preferably two planet gears 24, 26 engaging the sun gear 20 and the ring gear 22. The housing 12 is provided with a pair of bearings 28, 30 around an outer surface 32 which bearings are received in mounting plates 34, 36 respectively. A pair of stabilizer or cover plates 37, 39 bolted to the mounting plates 34, 36 respectively, only one bolt 41 being shown, supports the planetary gear set and armature. It can be seen that as the armature emf 18 is rotated in the direction of the arrow A in FIG. 1, the gear set causes the housing and magnetic field to rotate in the direction of arrow B in FIG. 1 opposite to that of the armature. If the housing is rotated at the same angular velocity as the armature, the coils carried by the armature will cut through the magnetic field at an effective angular velocity twice that at which they are actually rotating. Accordingly, for a given angular velocity of the coils, the device will theoretically produce twice the emf that a device having a stationary magnetic field would produce. Losses and inefficiencies would however reduce the increased emf produced to some fraction of the theoretical but still greater than otherwise generated by a stationary magnetic field device.

Figure 2:
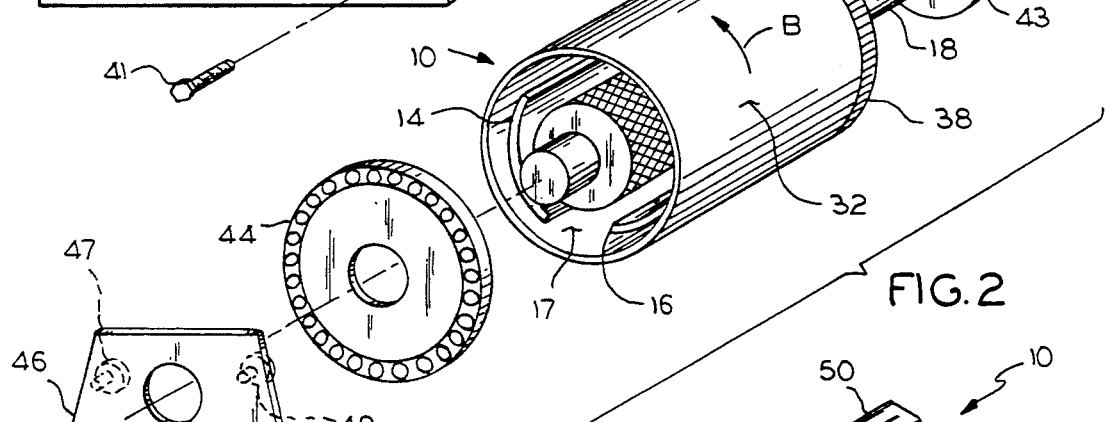
FIG. 2 is an exploded view of an alternative embodiment of the invention showing details of construction.

Another embodiment is shown in FIG. 2 wherein the gear means for rotating the housing includes a ring gear 38 mounted on the external surface 32 of the housing engaged by a pinion gear 40 operatively connected to driven gear 42 which is driven by a drive gear 43 mounted on the armature 18 of the device. The armature and housing are both mounted to bearings, only one of which is shown in FIG. 2, for independent co-axial rotation. The bearings in turn are mounted to a support plates, only one of which 46 is shown in FIG. 2.

As shown in FIG. 2, depending on the size of the device, it may be desirable to provide rotatable guide members such as 47, 48, on the support plates 46 which engage against the outer surface 32 of the housing 12 to further support and guide the housing for rotation.

If desired, the pinion gear 40 can be operatively connected to the drive gear 42 by way of a transmission an/or clutch unit 50. A clutch or transmission may be desirable in large generating units where the rotating mass of the housing would be very high. In such case, the armature could be disconnected from the housing by the clutch until the armature is brought up to or near its operating speed at which time the pinion gear would be connected to the drive gear 42 to rotate and bring the housing up to its operational speed. Such an arrangement would reduce the power required to bring the unit up to its operating speed. Alternatively, a transmission could be used to progressively step the speed of the housing up to its operational speed as the armature speed is increased.

Figure 3:
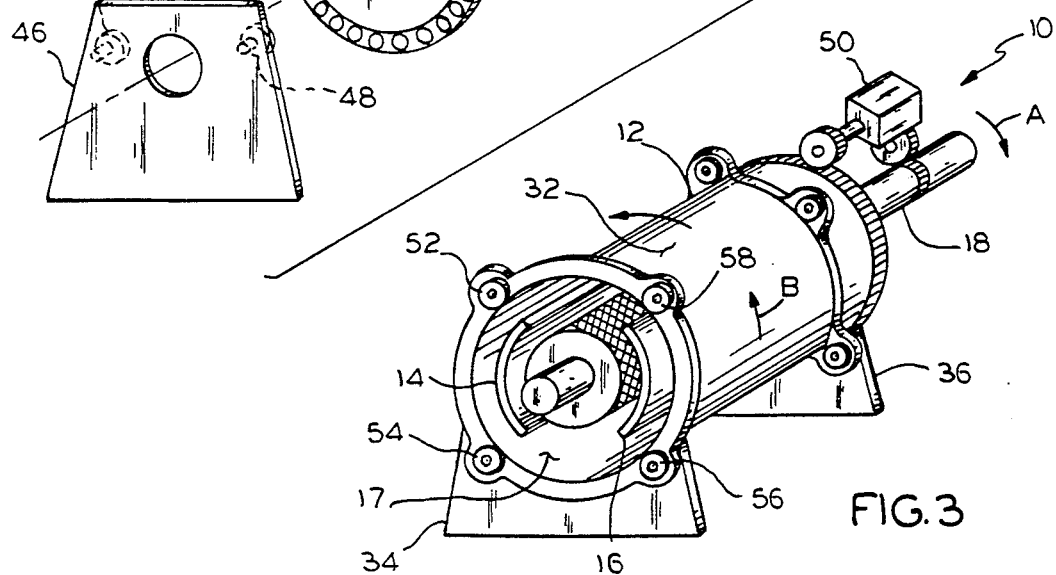
FIG. 3 is a perspective view of another alternative embodiment of the invention showing details of construction.

The embodiment shown in FIG. 3 is substantially the same as that shown in FIG. 2 except that the housing is journaled for rotation within a plurality of externally mounted and circumferentially spaced apart rollers 52, 54, 56, 58 mounted on the support plates and engaging the outer surface 32 of the housing.

Many other gear means and bearing arrangements for relatively rotating the housing and armature are of course possible without deviating from the invention and such other means are contemplated to be within the scope of the appended claims.

What is claimed is:

1. A generator comprising:
   a tubular housing mounted for rotation including magnetic field generating means mounted to an inside surface of the tubular housing;
   an armature including a plurality of armature coils, said armature mounted for rotation co-axially within said housing; and
   means for rotating said housing simultaneously with the rotation of said armature in a direction opposite to a direction of rotation of said armature including means for selectively connecting and disconnecting rotation of the housing from the rotation of the armature.

2. The generator as defined in claim 1 wherein said means for rotating said housing includes gear means connecting said armature to said housing, said gear means including transmission means providing for said selective connecting and disconnecting said armature from said housing.

3. The generator as defined in claim 2 wherein said gear means includes a first gear on said armature, a second gear defining a drive gear associated with said transmission means mounted for rotation by the first gear, a pinion gear mounted for rotation by said second gear through said transmission means and a ring gear on said housing connected to said pinion gear.

4. The generator as defined in claim 2 including means for supporting said housing, said means for supporting said housing including bearing means for rotationally journaling said housing to said means for supporting.

5. A generator comprising:
   a tubular housing;
   magnetic field creating means mounted to an inner surface of said tubular housing;
   means for supporting said tubular housing for rotation;
   an armature including armature coils mounted co-axially within said housing for rotation; and
   gear means interconnecting said armature and said housing for simultaneously rotating said housing and said armature in opposite directions including means for selectively connecting and disconnecting said armature from said housing.

6. The generator as defined in claim 5 wherein said gear means for simultaneously rotating said housing and said armature in opposite directions comprises a drive gear mounted on said armature, variable speed gear transmission means including at least one intermediate gear driven by said drive gear, a pinion gear driven by said transmission means and a ring gear on said housing driven by said pinion gear.

7. The generator as defined in claim 5 wherein said means for selectively connecting and disconnecting said armature from said housing includes clutch means associated with said gear means.

* * * * *